(12) United States Patent
Suto (10) Patent No.: US 7,032,004 B2
(45) Date of Patent: Apr. 18, 2006

(54) COMMUNICATION TRAFFIC CONTROL SYSTEM ON LAN, COMMUNICATION TRAFFIC CONTROL METHOD AND RECORDING MEDIUM STORING COMMUNICATION TRAFFIC CONTROL PROGRAM

(75) Inventor: Eizo Suto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 10/002,984

(22) Filed: Nov. 1, 2001

(65) Prior Publication Data
US 2002/0039410 A1 Apr. 4, 2002

Related U.S. Application Data

(63) Continuation of application No. PCT/JP99/05397, filed on Sep. 30, 1999.

(30) Foreign Application Priority Data
May 25, 1999 (JP) ................................. 11-145295

(51) Int. Cl.
*G06F 15/16* (2006.01)
(52) U.S. Cl. ...................... 709/203; 709/224; 709/213; 707/3; 707/10
(58) Field of Classification Search ................ 709/203, 709/217–219, 213, 224–225, 238; 707/3, 707/10
See application file for complete search history.

(56) References Cited

U.S. PATENT DOCUMENTS 5,483,533 A * 1/1996 Kuba .......................... 370/232
5,852,717 A * 12/1998 Bhide et al. ................. 709/203
5,940,594 A * 8/1999 Ali et al. ..................... 709/203
6,513,061 B1 * 1/2003 Ebata et al. ................. 709/203

FOREIGN PATENT DOCUMENTS

| EP | 0837407 A1 * | 4/1998 |
| JP | 7-334508 | 12/1995 |
| JP | 08063418 A | 3/1996 |
| JP | 10-198623 | 7/1998 |
| JP | 10-214217 | 8/1998 |
| WO | EP 0 837 407 A1 | 10/1997 |

OTHER PUBLICATIONS

Kazumitsu, "Communication Traffic Controller for Network System", Japanese Publication No. 08-063418, 1996.*

* cited by examiner

*Primary Examiner*—Philip B. Tran
(74) *Attorney, Agent, or Firm*—Greer, Burns & Crain, Ltd.

(57) ABSTRACT

A communication traffic control system of this invention is directed to reduce traffic on a LAN. In LAN (1) of a CSMA/CD type having a server computer (2), a first client computer (3), a second client computer (4) and other third, fourth . . . client computers connected thereto, when the first client (3) generates a transmission request A of an object to the server (2) and receives an object A corresponding to the transmission request A from the server (2), the second client (4) stores the transmission request A and the object A corresponding to the former in a storage unit (41) inside the second client (4). When the second client (4) thereafter generates a transmission request A for acquiring the same object A stored in the storage unit (41) to the server (2), it directly acquires the object A from the storage unit (41) without it passing through LAN (1).

9 Claims, 6 Drawing Sheets

COMMUNICATION TRAFFIC CONTROL SYSTEM ON LAN, COMMUNICATION TRAFFIC CONTROL METHOD AND RECORDING MEDIUM STORING COMMUNICATION TRAFFIC CONTROL PROGRAM

CROSS-REFERENCE TO RELATED APPLICATIONS

This application is based upon and claims priority of Japanese Patent Application No. 11-145295, filed May 25, 1999, the contents being incorporated therein by reference, and a continuation of PCT/99/05397.

TECHNICAL FIELD

This invention relates to a communication traffic control system on a local area network (LAN), a communication traffic control method and a recording medium recording a communication traffic control program. More particularly, this invention relates to a communication traffic control system on a LAN for executing control so as to reduce communication traffic on the LAN, a communication traffic control method and a recording medium storing a communication control program when communication is done between a server and a client by use of HTTP (Hyper Text Transfer Protocol) through a LAN, of CSMA/CD (Carrier Sense Multiple Access with Collision Detection) type, in which the server and clients are connected to one another.

BACKGROUND ART

When a frame, as one transfer unit, comprising a transmitting party address, a destination party address, data, etc, is transmitted through a LAN of a CSMA/CD type having a plurality of stations such as servers and clients connected thereto, transmission of the frame is executed when an idle state is detected by detecting the existence/absence of a carrier on a LAN (a carrier sensee), that is, by detecting whether a LAN is busy (a frame exists) or idle (a frame is absent). The station that transmits the frame monitors collision with frames transmitted from other stations (collision detection). Upon detecting collision, the station transmits a jamming signal for a predetermined time, positively notifies collision to other stations and then suspends transmission. After waiting for an arbitrary time, the station repeats the state monitor and attempts to again transmit the frame.

When HTTP is used for communication between a server and a client, the communication needs time depending on the processing capacity of the server, the busy time of the LAN becomes longer, and the possibility that the client must wait becomes greater.

As a system for executing control so as to decrease traffic on a LAN, a system that disposes a proxy server between the server and the client is known. In a proxy server system, when the client sends a transmission request, for an object, to the server, the proxy server receives the transmission request, returns it to the server, receives an object corresponding to the transmission request from the server, and transmits the object so received to the client. The proxy server stores the transmission request and the object received in response to the transmission request in a storage unit. When the client thereafter generates the same transmission request, the proxy server directly transmits the object corresponding to the transmission request and stored in the storage unit to the client without passing through the server. In this way, it becomes possible to reduce the delay time in communication, resulting from the processing capacity of the server, or, to save the time necessary for transmitting the object corresponding to the transmission request after the server receives the transmission request.

In the proxy server system described above, however, the LAN remains always busy while each client generates the transmission request to the server even though the transmission request stored in the storage unit of the proxy server coincides with the one generated by the client. In other words, this system cannot sufficiently reduce the traffic on a LAN.

DISCLOSURE OF THE INVENTION

To solve the problem described above, it is therefore an object of the present invention to provide a communication traffic control system on a LAN that executes control so as to reduce the traffic on a LAN, a communication traffic control method, and a recording medium storing a communication traffic control program.

In a communication traffic control system on a LAN of a CSMA/CD type having servers and clients connected thereto, the traffic control system on a LAN, according to the present invention, to accomplish the above-mentioned object comprises: reception means for enabling another client to receive a transmission request and an object corresponding to the transmission request when one client generates the transmission request of the object to a server and receives the object corresponding to the transmission request from the server; a storage unit, disposed inside the one client, for storing the transmission request and the object corresponding to the transmission request; judgment means for judging whether or not the object corresponding to the transmission request is stored in the storage unit when the one client generates the transmission request to the server; and object acquisition means for directly acquiring the object corresponding to the transmission request from the storage unit without passing through LAN when the judgment result of the judgment means is positive, and acquiring the object corresponding to the transmission request from the server through the LAN when the judgment result of the judgment means is negative.

The construction described above can reduce the traffic on a LAN.

In the traffic control system on a LAN according to the present invention, the object stored in the storage unit is an object of a predetermined kind set in advance, or an object corresponding to a transmission request generated from a client having an IP address set in advance.

The construction described above can reduce the used capacity of the storage unit and can shorten the time necessary for retrieving the object.

In the traffic control system on a LAN according to the present invention, the object stored in the storage unit is appropriately updated.

In the traffic control system on a LAN according to the present invention, the storage unit stores the transmission request of the object, that one client generates to the server, and the object corresponding to the transmission request.

In a communication traffic control method on a LAN of a CSMA/CD type having servers and clients connected thereto, the traffic control method on a LAN, according to the present invention, to accomplish the object described above comprises: a first step of allowing another client to receive a transmission request and an object corresponding to the transmission request when one client generates the transmission request for the object to a server and receives the object, corresponding to the transmission request, from the server; a second step of storing the transmission request and the object corresponding to the transmission request in a storage unit disposed inside the one client; a third step of judging whether or not the object corresponding to the transmission request is stored in the storage unit when the one client generates the transmission request to the server; and a fourth step of directly acquiring the object corresponding to the transmission request from the storage unit without passing through the LAN when the judgment result of the third step is positive, and acquiring the object corresponding to the transmission request from the server through the LAN when the judgment result of the third step is negative.

The traffic control method on a LAN according to the present invention includes a step of selecting a predetermined kind of an object set in advance for the object stored in said storage unit.

The traffic control method on a LAN according to the present invention includes a step of selecting the object stored in the storage unit that corresponds to the transmission request generated by a client having an IP address set in advance.

The traffic control method on a LAN according to the present invention includes a step of appropriately updating the object stored in the storage unit.

The traffic control method on a LAN according to the present invention includes a step of storing the transmission request for the object, that the one client generates to the server and the object corresponding to the transmission request in the storage unit.

In a recording medium for use in a communication traffic control system on a LAN of a CSMA/CD type having servers and clients connected thereto, a computer-readable recording medium recording therein, a communication traffic control program on a LAN according to the present invention to accomplish the object described above is characterized by recording the program for allowing a computer to execute: a first step of allowing other client to receive a transmission request and an object corresponding to the transmission request when one client generates the transmission request of the object to a server and receives the object corresponding to the transmission request from the server; a second step of storing the transmission request and the object corresponding to the transmission request in a storage unit disposed inside the one client; a third step of judging whether or not the object corresponding to the transmission request is stored in the storage unit when the one client generates the transmission request to the server; and a fourth step of directly acquiring the object corresponding to a transmission request from the storage unit without passing through the LAN when the judgment result of the third step is positive, and acquiring the object corresponding to the transmission request from the server through the LAN when the judgment result of the third step is negative.

BEST MODE FOR CARRYING OUT THE INVENTION

Hereinafter, an embodiment of the present invention will be explained in detail with reference to the accompanying drawings.

Figure 1:
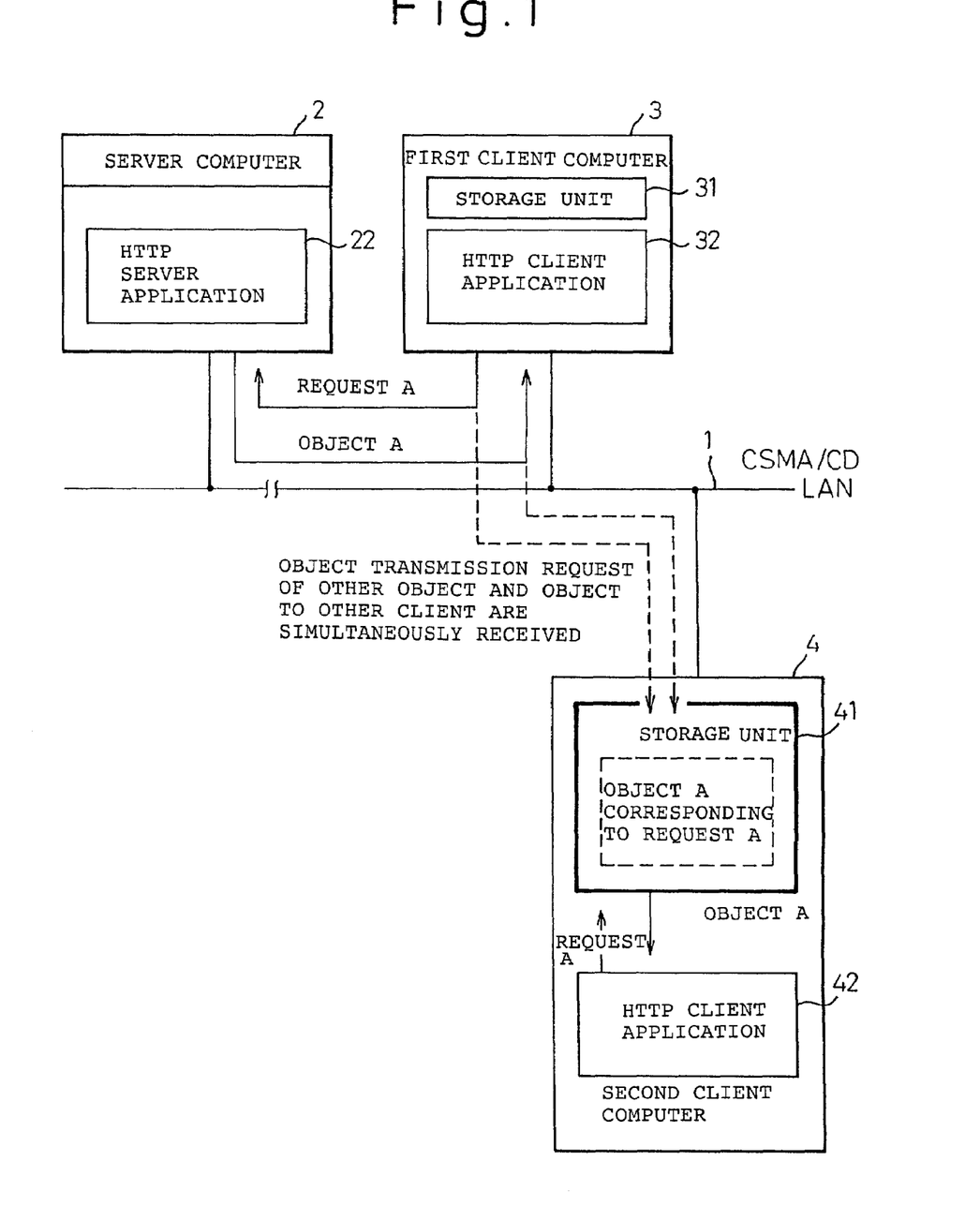
FIG. 1 is a schematic structural view of a communication traffic control system on a LAN according to an embodiment of the present invention.

FIG. 1 is a schematic structural view of a communication traffic control system on a LAN according to an embodiment of the present invention. In the traffic control system on a LAN according to the present invention, a server computer 2, a first client computer 3, a second client computer 4 and other third to nth client computers (not shown) are connected to LAN 1 as shown in FIG. 1. This LAN 1 uses the CSMA/CD system. Hereinafter, the server computer and the first and second computers will be merely called the "server" and the "first and second clients".

When the first client 3 generates a transmission request A of an object to the server 2 and receives the object A from the server 2 in response to the transmission request A, the second client 4 stores the transmission request A and the object A corresponding to this request in a storage unit 41 inside the second client 4. When the second client 4 generates subsequently the transmission request A for obtaining the same object A stored in the storage unit 41, it directly acquires the object A from the storage unit 41 without passing through LAN 1.

To this end, the server 2 has an HTTP server application program 22, and each client 3, 4 has an HTTP client application program 32, 42 and a storage unit 31, 41. (The application program will be merely called hereinafter the "application").

Figure 2:
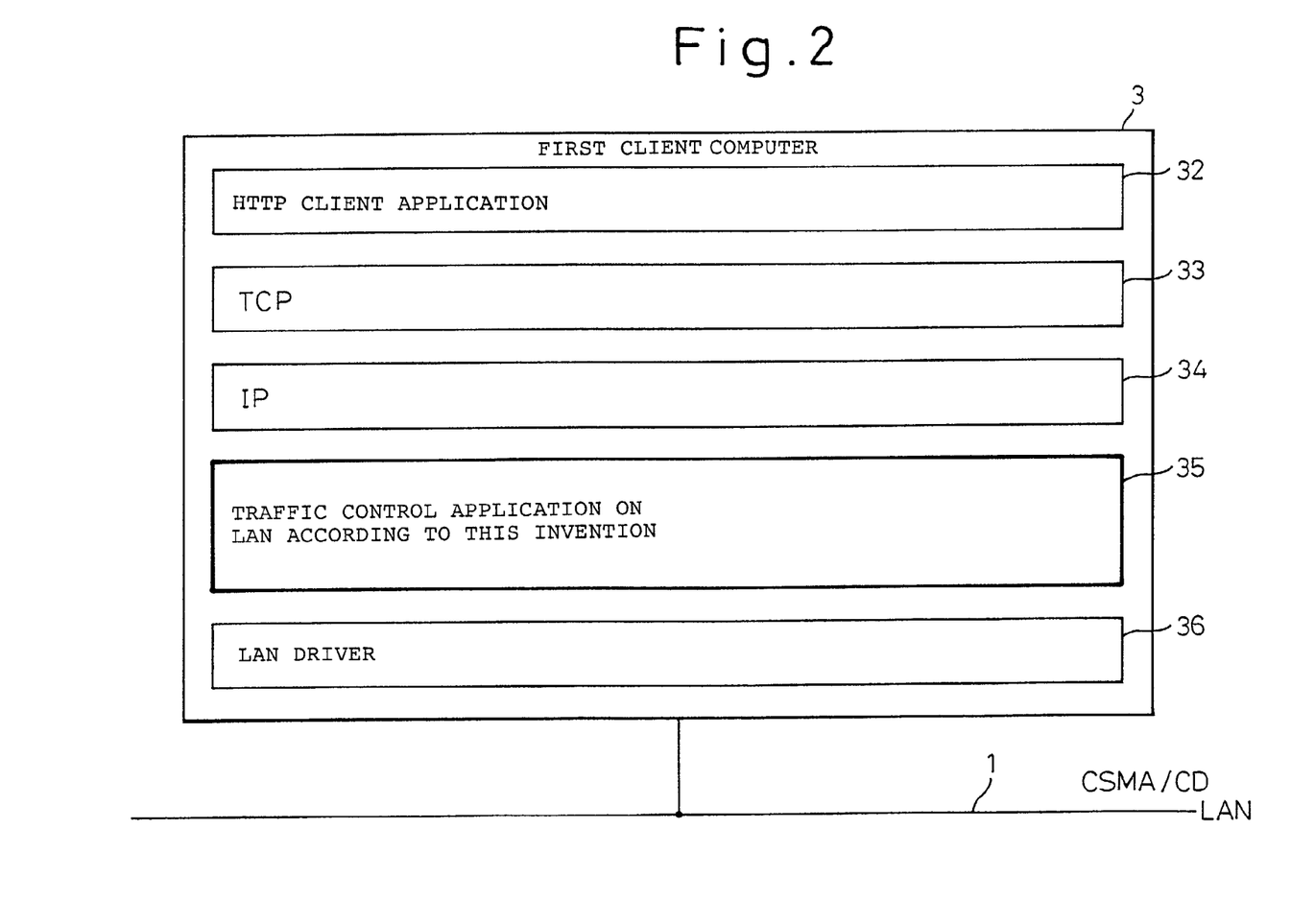
FIG. 2 is a conceptual view of an Internet architecture relating to frame communication of a client computer shown in FIG. 1.

FIG. 2 is a conceptual view of an Internet architecture relating to frame communication of the client computer shown in FIG. 1. Though FIG. 2 illustrates the first client computer 3 by way of example, other client computers and the server computer 2, too, have a similar Internet architecture.

As shown in FIG. 2, this internet architecture comprises an HTTP client application 32 as a web browser, a TCP (Transmission Protocol) 33, an IP (Internet Protocol) 34, a traffic control application 35 on the LAN according to the present invention and a LAN driver 36. The LAN driver 36 connected to LAN 1 has a program for executing the CSMA/CD system, transmits the frame according to TCP 33 and IP 34, such as the transmission request, from the client to the server 2 or to another client through LAN 1 under control of the HTTP client application 32, and receives the frame transmitted from the server 2 or another client, such as the object the server 2 transmits in response to the transmission request described above.

Figure 3A:
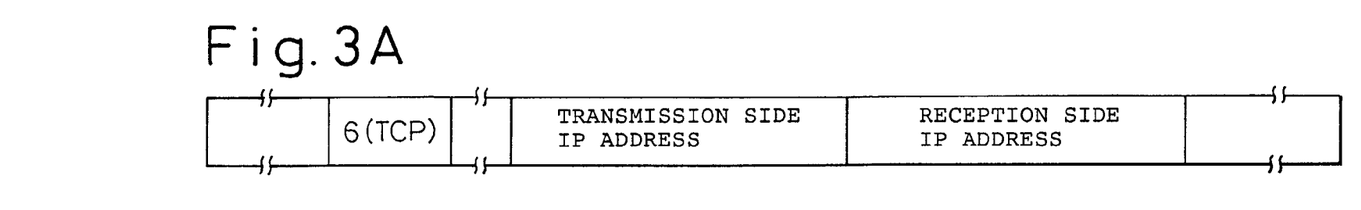
FIG. 3A shows a format of a header of a protocol IP used in the present invention.

FIG. 3A shows the format of the header of the protocol IP used in the present invention. As shown in FIG. 3(A), the format of the IP header includes a 32-bit source address (transmission side IP address) and a 32-bit destination address (reception side IP address).

Figure 3B:
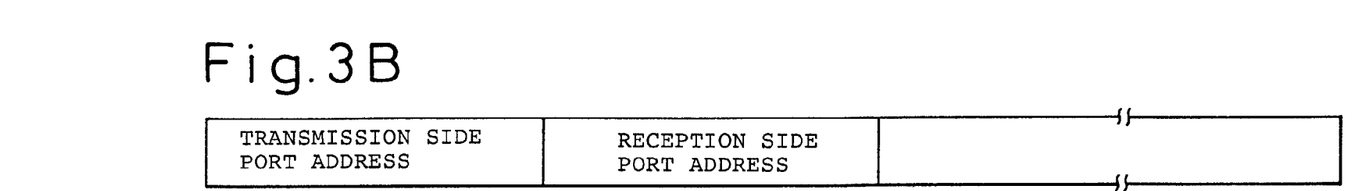
FIG. 3B shows a format of a header of a protocol TCP used in the present invention.

FIG. 3B shows the format of the header of the protocol TCP used in the present invention. As shown in FIG. 3(B), the format of the TCP header includes a 16-bit source port (transmission side port address) and a 16-bit destination port (reception side port address) in succession to the IP header.

Figures 3C, 3D:
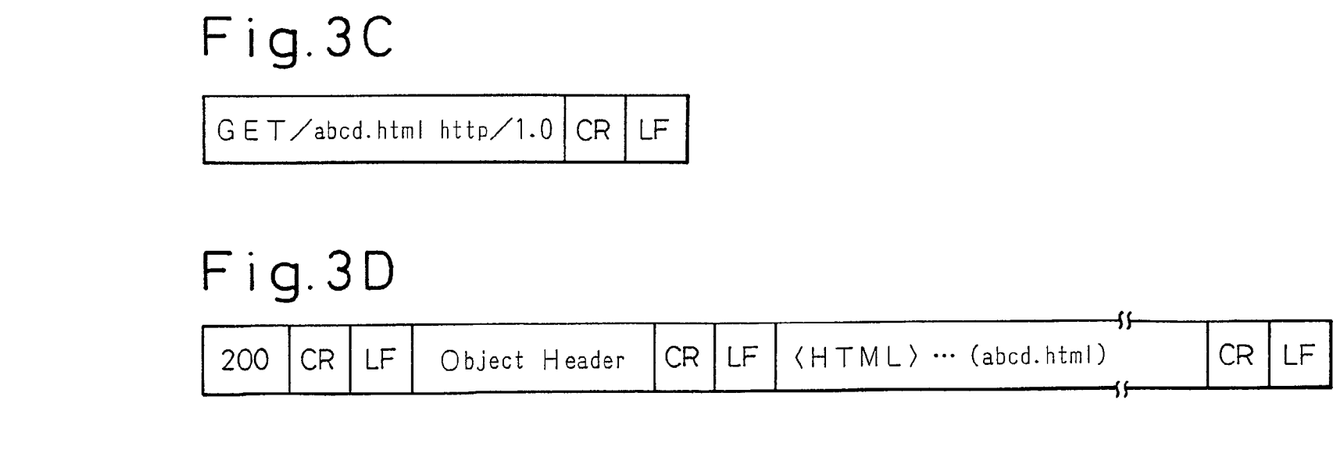
FIG. 3C shows a transmission request format of an object used in the present invention.
FIG. 3D shows typically a response format of the object used in the present invention.

FIG. 3C shows a typical transmission request format of the object used in the present invention. As shown in FIG. 3C, the format of the transmission request of the HTTP message (object) is described as "GET/abcd.html http/1.0 CR LF" in succession to the TCP header. Here, "GET/abcd.html" represents a URI (Uniform Resource Identification) transmission request abcd.html continuing the character string "GET". "http/1.0" is a character string representing the version of "http". "CR" represents "Carriage Return" and "LF" does "Line Feed".

FIG. 3D shows typically the response format of the object, as used in the present invention. As shown in FIG. 3(D), in the response format of the HTT message (object), "200" continuing the TCP header is a status code representing the success, "Object Header" is a character string representing various information of the object such as an object length, and <HTML> . . . (abcd.html) is the object main body.

Figure 4:
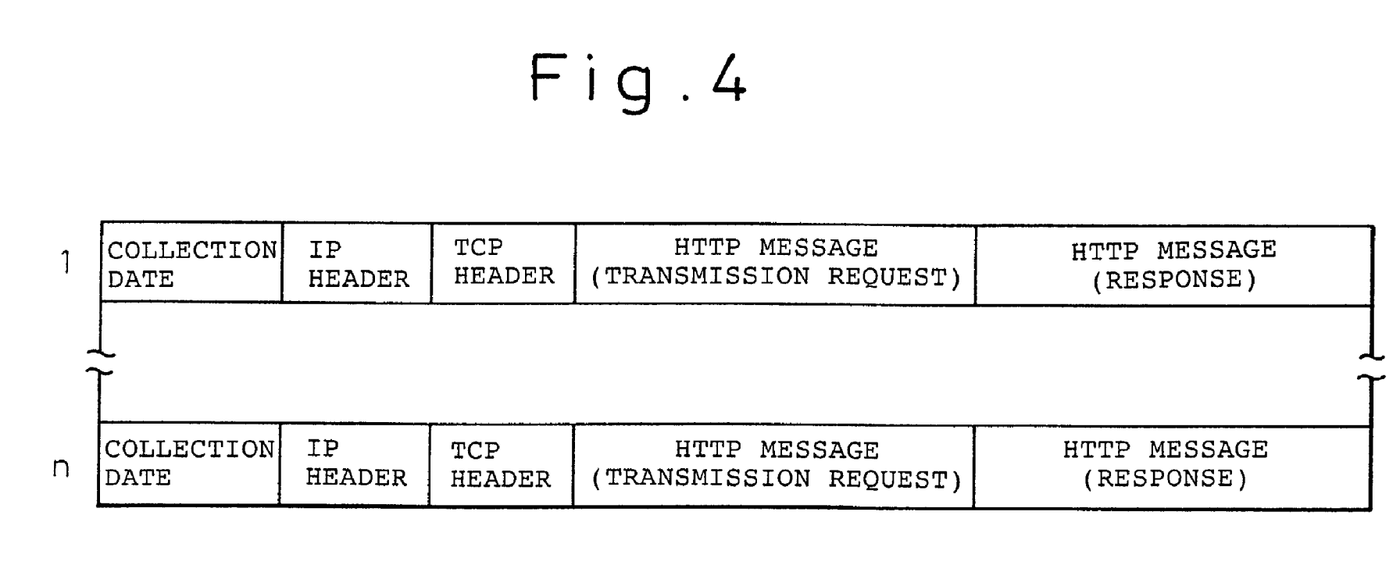
FIG. 4 shows a storage unit inside a client computer for storing a transmission request of an object and its response.

FIG. 4 shows the storage unit inside the client computer that stores the transmission request of the object and its response. As shown in FIG. 4, one set of data comprises the transmission request of the HTTP message generated from the client, the response of the HTTP message received from the server in response to the transmission request, the collection date, the IP header and the TCP header. The storage unit stores n sets of such data. When the transmission request generated by the client has already been stored in the storage unit, the corresponding response is read and the frame of the transmission request is not outputted to the LAN. The processing of the present invention for executing this process, that is, the traffic control application 35 on the LAN shown in FIG. 2, will be explained with reference to FIGS. 5 and 6.

Figure 5:
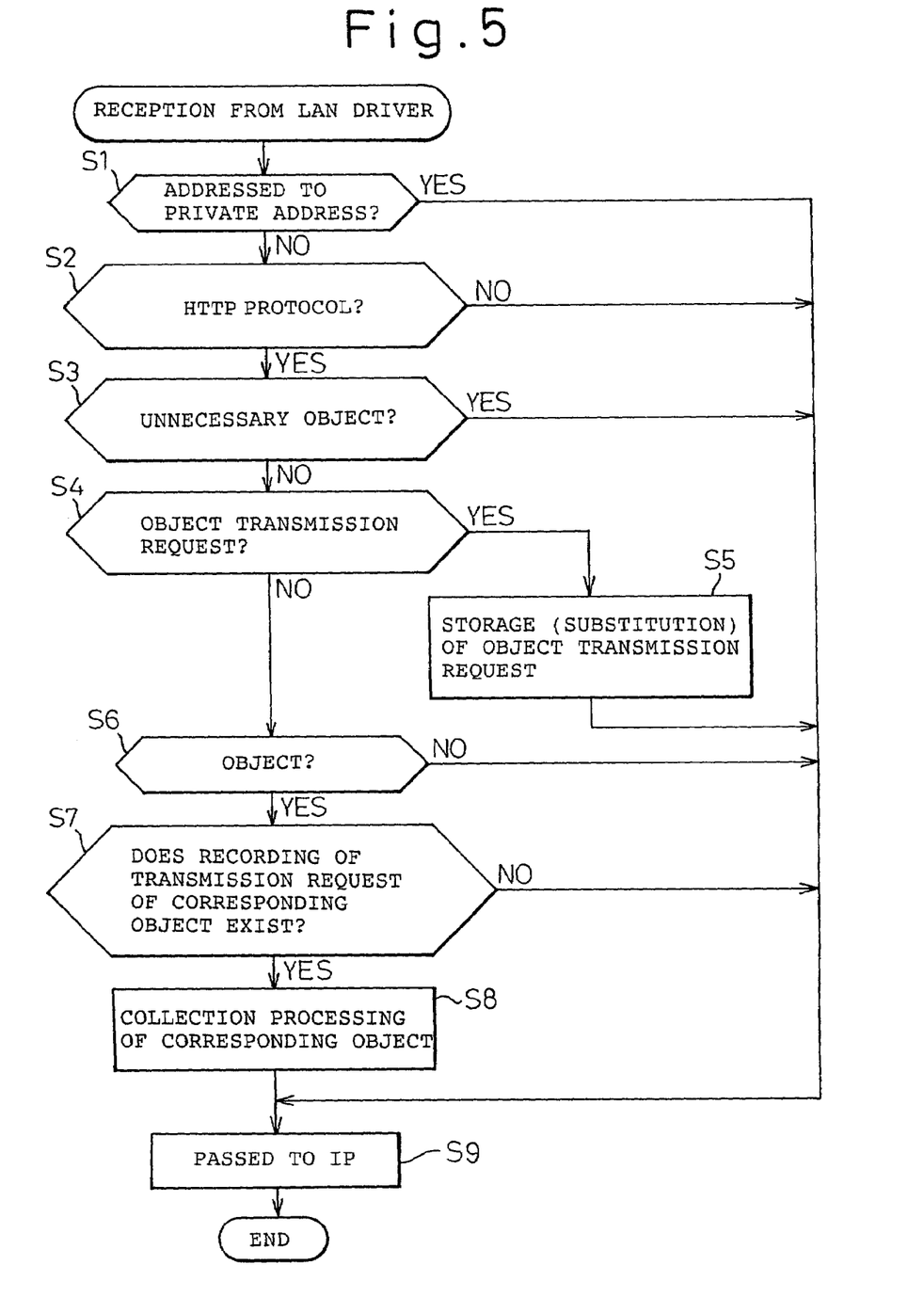
FIG. 5 is a flowchart showing a reception routine in communication traffic control on a LAN according to the present invention.

FIG. 5 is a flowchart showing a reception processing routine in the traffic control on a LAN according to the present invention. FIG. 5 shows the processing when the client receives the frame from a LAN through the LAN driver. This routine is executed in a predetermined cycle.

First, in step S1, whether or not the data received from the LAN driver is the data addressed to the private node (client) is judged by judging whether or not the reception side IP address of the IP header is equal to the private IP address. When the judgment result proves YES, the flow proceeds to the step S9. The data is passed to IP and an ordinary communication process is executed at this step S9. When the judgment result proves NO, on the other hand, the flow proceeds to the step S2.

In step S2, whether or not the data received from the LAN driver is the HTTP message is judged by judging whether or not it contains both the TCP and the HTTP message. When the judgment result proves NO, the flow proceeds to the step S9, and when it is YES, the flow proceeds to the step S3.

In the step S3, whether or not the data received from the LAN driver is data that need not be stored in the predetermined storage unit is judged by judging whether or not the IP address of the IP header coincides with a set value, or whether or not a URI (Uniform Resource Identifier) continuing the character string GET coincides with a set value. When the judgment result is YES, the flow proceeds to step S9 and when NO, to step S4. The processing of this step S3, that is, filtering, can prevent data irrelevant to the private node from being stored in the storage unit, can save the capacity of the storage unit and can shorten the time necessary for retrieving the object.

In step S4, it is determined whether or not the data received from the LAN driver relates to the transmission request of the object. When the judgment result is YES, the flow proceeds to step S5 and when NO, to step S6.

In step S5, the data relating to the transmission request is stored into the storage unit as shown in FIG. 5. When the same transmission request has already been stored in the storage unit, the data is updated (substituted). After step S5 is executed, the flow proceeds to step S9.

In step S6, it is determined whether or not the data received from the LAN driver relates to the response of the object. When the judgment result is YES, the flow proceeds to step S9. The judgment in step S6 compares the following items ① to ④ for the data of the transmission requests of all the objects stored in step S5.

① The transmission side IP address of the recorded transmission request coincides with the reception side IP address of the received data.

② The reception side IP address of the recorded transmission request coincides with the transmission side IP address of the received data.

③ The transmission side port address of the recorded transmission request coincides with the reception side port address of the received data.

④ The reception side port address of the recorded transmission request coincides with the transmission side port address of the received data.

When all the comparison results ① to ④ are judged as coincident, the information of the transmission request of the object is judged as existing, and the flow proceeds to step S7. When any one of the comparison results ① to ④ is not judged as coincident, the flow proceeds to step S9.

In step S7, whether or not the record of the transmission request of the object exists is judged by comparing the IP headers, the TCP headers and URI. When all of them are coincident, the flow proceeds to step S8 and when any one of them is not coincident, the flow proceeds to step S9.

In step S8, the data received from the LAN driver is judged as the object corresponding to the transmission request of this object, and the collection processing of the object is executed. In other words, the object is stored in the location corresponding to the transmission request shown in FIG. 4. After the step S8 is executed, the flow proceeds to the step S9. In this step S9, the data is passed to IP and the ordinary communication process is executed.

Figure 6:
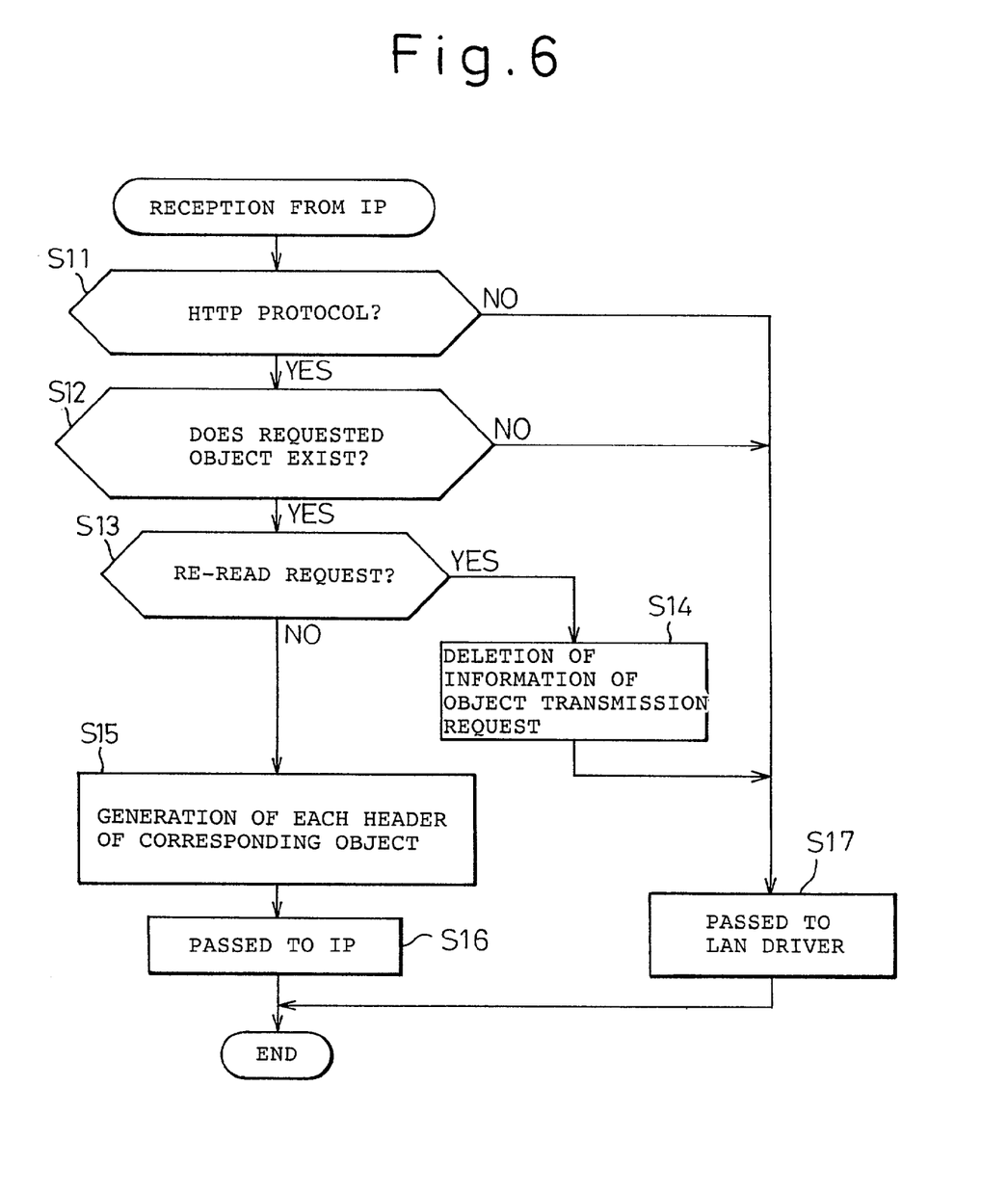
FIG. 6 is a flowchart showing a transmission routine in communication traffic control on a LAN according to the present invention.

FIG. 6 is a flowchart showing a transmission processing routine in the traffic control on a LAN according to the present invention. FIG. 6 shows the process when the client transmits the frame to a LAN through the LAN driver. This routine is executed in the predetermined cycle.

First, in step S11, whether or not the transmission request of the object received from IP is the transmission request of the object of HTTP is judged. When the judgment result is YES, the flow proceeds to step S12 and when NO, to step S17. In step S17, the data is passed to the LAN driver.

In step S12, the following comparisons ① to ③ are made for the data of the transmission request of the object received from IP.

① The transmission side IP address of the recorded transmission request coincides with the transmission side IP address of the received data.

② The transmission side port address of the recorded transmission request coincides with the transmission side port address of the received data.
③ URI of the recorded transmission request coincides with URI of the received data.

When all the comparison results ① to ③ are judged as coincident, the requested object is judged as existing and the flow proceeds to step S13. When any one of the comparison results ① to ③ is not judged as coincident, the flow proceeds to step S17.

In step S13, whether or not the transmission request of the object received from IP is a re-read request is judged by judging whether or not the designation date of the header field stored in the storage unit is newer than this object. When the judgment result is YES, the flow proceeds to step S14. When the judgment result is NO, that is, when the transmission request is judged as a reread request, the flow proceeds to step S15.

In step S14, the information of the transmission request of the object is deleted, and the object is thus prevented from becoming old. The flow then proceeds to step S17, at which the data is passed to the LAN driver.

The processing of steps S13 and S14 can always update the data of the storage unit, whenever necessary.

In step S15, header information is generated as in the case of the reception from the HTTP application. The flow then proceeds to step S16. In this step S16, the data is passed to IP, the ordinary communication process is executed and the object is transmitted to IP.

Next, the processing of the program recorded to a recording medium according to the present invention will be briefly explained. The client computer of the present invention is a computer system including a central processing unit (CPU) and a recording medium such as a memory or a magnetic disk. A disk drive for a portable recording medium, such as a floppy disk or a hard disk drive is provided to this computer system. A program, for allowing a computer to execute each process step of the present invention, recorded into the portable recording medium such as the floppy disk through a predetermined operation, is read through the floppy disk drive or the hard disk drive of which the program has been stored and is loaded to memory. Needless to say, an operator may well directly write the program into the memory of the computer system through input means such as a keyboard. Alternatively, the program stored in memory, for example, as the recording medium of the computer system of another client computer may be loaded to the memory of a computer system through a LAN (communication line) and terminal units. Thereafter, the program so loaded to the memory is executed, whenever necessary, by the processing CPU of the computer system.

As explained above, the present invention decreases the occasions of transfer of frames onto a LAN and can therefore reduce the traffic on the LAN.

The invention claimed is:

1. A communication traffic control system comprising:
a local area network (LAN) of a carrier sense multiple access with collision detection system (CSMA/CD) having servers and clients connected thereto;
reception means for enabling another client to receive a transmission request and an object corresponding to said transmission request when one client generates said transmission request of said object to a server and receives said object corresponding to said transmission request from said server;
a storage unit disposed inside said one client, for storing said transmission request and said object corresponding to said transmission request;
judgment means for judging whether or not said object corresponding to said transmission request is stored in said storage unit when said one client generates said transmission request to said server; and
object acquisition means for directly acquiring said object corresponding to said transmission request from said storage unit without passing through said local area network (LAN) when the judgment result of said judgment means is positive, and acquiring said object corresponding to said transmission request from said server through said local area network (LAN) when the judgment result of said judgment means is negative,
wherein each client comprises said reception means, said storage unit, said judgment means and said object acquisition means, and
wherein when said judgment means judges that the record of said transmission request of said object exists in said storage unit by determining if an internet protocol (IP) header, a transmission protocol (TCP) header and a uniform resource identification (URI) of said transmission request coincide with corresponding information of any one of the stored objects, said storage unit stores said transmission request of said object that said one client generates to said server and said object corresponding to said transmission request, and thereby collection processing of said object is executed.

2. A traffic control system on a local area network (LAN) according to claim 1, wherein said object stored in said storage unit is of a predetermined kind set in advance.

3. A traffic control system on a local area network (LAN) according to claims 1 or 2, wherein said object stored in said storage unit is determined as an object corresponding to a transmission request generated from a client having an internet protocol (IP) address set in advance when all of the following conditions are met:
(i) a transmission side internet protocol (IP) address of a recorded transmission request coincides with a reception side internet protocol (IP) address of received data;
(ii) a reception side internet protocol (IP) address of said recorded transmission request coincides with a transmission side internet protocol (IP) address of received data;
(iii) a transmission side port address of said recorded transmission request coincides with a reception side port address of received data; and
(iv) a reception side port address of said recorded transmission request coincides with a transmission side port address of received data.

4. A method of controlling traffic on a local area network (LAN) according to either of claims 1 or 2, wherein header information is generated when data of said transmission request of said object received from Internet Protocol satisfies the following conditions:
(i) a transmission side internet protocol (IP) address of a recorded transmission request coincides with a transmission side internet protocol (IP) address of received data;
(ii) a transmission side port address of said recorded transmission request coincides with a transmission side port address of received data; and
(iii) uniform resource identification (URI) of said recorded transmission request coincides with uniform resource identification (URI) of received data.

5. A method of controlling communication traffic on a local area network (LAN) of a carrier sense multiple access with collision detection system (CSMA/CD) having servers and clients connected thereto, wherein each client can perform the steps of:
- a first step of allowing another client to receive a transmission request and an object corresponding to said transmission request when one client generates said transmission request of said object to a server and receives said object corresponding to said transmission request from said server;
- a second step of storing said transmission request and said object corresponding to said transmission request in a storage unit disposed inside said one client;
- a third step of judging whether or not said object corresponding to said transmission request is stored in said storage unit when said one client generates said transmission request to said server;
- a fourth step of directly acquiring said object corresponding to said transmission request from said storage unit without passing through said local area network (LAN) when the judgment result of said third step is positive, and acquiring said object corresponding to said transmission request froze said server through said local area network (LAN) when the judgment result of said third step is negative; and
- a fifth step of storing said transmission request of said object that said one client generates to said server and said object corresponding to said transmission request in said storage unit when it is judged that the record of said transmission request of said object exists in said storage unit by determining if an internet protocol (IP) header, a transmission protocol (TCP) header and a uniform resource identification (URI) of said transmission request coincide with corresponding information of ante of the stored objects, thereby collection processing-of said object is executed.

6. A method of controlling traffic on a local area network (LAN) according to claim 5, which further includes a step of selecting a predetermined kind of an object set in advance for said object stored in said storage unit.

7. A method of controlling traffic on a local area network (LAN) according to claim 5 or 6, which further includes a step of selecting said object stored in said storage unit that corresponds to said transmission request generated from a client having an internet protocol (IP) address set in advance when all of the following conditions are met:
(i) a transmission side internet protocol (IP) address of a recorded transmission request coincides with a reception side internet protocol (IP) address of received data;
(ii) a reception side internet protocol (IP) address of said recorded transmission request coincides with a transmission side internet protocol (IP) address of received data;
(iii) a transmission side port address of said recorded transmission request coincides with a reception side port address of received data; and
(iv) a reception side port address of said recorded transmission request coincides with a transmission side port address of received data.

8. A traffic control system on a local area network (LAN) according to either of claims 5 or 6, wherein header information is generated when data of said transmission request of said object received from Internet Protocol satisfies the following conditions:
(i) a transmission side internet protocol (IP) address of a recorded transmission request coincides with a transmission side internet protocol (IP) address of received data;
(ii) a transmission side port address of said recorded transmission request coincides with a transmission side port address of received data; and
(iii) uniform resource identification (URI) of said recorded transmission request coincides with uniform resource identification (URI) of received data.

9. A computer-readable recording medium for use inn a communication traffic control system on a local area network (LAN) of a carrier sense multiple access with collision detection system (CSMA/CD) having servers and clients connected thereto, recording therein a program for allowing a computer in each client to execute the following steps:
- a first step of allowing another client to receive a transmission request and an object corresponding to said transmission request when one client generates said transmission request of said object to a server and receives said object corresponding to said transmission request from said server;
- a second step of storing said transmission request and said object corresponding to said transmission request in a storage unit disposed inside said one client;
- a third step of judging whether or not said object corresponding to said transmission request is stored in said storage unit when said one client generates said transmission request to said server;
- a fourth step of directly acquiring said object corresponding to said transmission request from said storage unit without passing through said local area network (LAN) when the judgment result of said third step is positive, and acquiring said object corresponding to said transmission request from said server through said local area network (LAN) when the judgment result of said third step is negative; and
- a fifth step of storing said transmission request of said object that said one client generates to said server and said object corresponding to said transmission request in said storage unit when it is judged that the record of said transmission request of said object exists in said storage unit by determining if an internet protocol (IP) header, a transmission protocol (TCP) header and a uniform resource identification (URI) of said transmission request coincide with corresponding information of any one of the stored objects, thereby collection processing of said object is executed.

* * * * *